United States Patent
Frank et al.

(10) Patent No.: US 6,889,735 B2
(45) Date of Patent: May 10, 2005

(54) PNEUMATIC TIRE HAVING A RUBBER COMPONENT CONTAINING A DENDRIMER

(75) Inventors: Uwe Ernst Frank, Marpingen (DE); Friedrich Visel, Bofferdange (LU); Thierry Florent Edme Materne, Richfield, OH (US); Rene Jean Zimmer, Howald (LU); Wolfgang Lauer, Mersch (LU); Marc Weydert, Luxembourg (LU); Thomas Schildbach, Eischen (LU); Annette Lechtenböhmer, Ettelbruck (LU); Maurice Peter Catharina Jozef Klinkenberg, Gosseldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 91 days.

(21) Appl. No.: 10/352,844

(22) Filed: Jan. 28, 2003

(65) Prior Publication Data

US 2004/0020576 A1 Feb. 5, 2004

Related U.S. Application Data

(63) Continuation-in-part of application No. 09/912,208, filed on Jul. 24, 2001, now abandoned.
(60) Provisional application No. 60/222,723, filed on Aug. 3, 2000.

(51) Int. Cl.$^7$ ................................................. B60C 1/00
(52) U.S. Cl. ........................ 152/450; 525/105; 525/106; 525/123; 525/127; 525/165; 525/177; 525/178; 525/181
(58) Field of Search .................. 152/450; 525/106, 525/123, 127, 165, 177, 178, 181, 105

(56) References Cited

U.S. PATENT DOCUMENTS

| | | |
|---|---|---|
| 4,558,120 A | 12/1985 | Tomalia et al. .............. 528/363 |
| 5,276,110 A | 1/1994 | Zhou et al. .................. 525/479 |
| 5,530,092 A | 6/1996 | Meijer et al. ................ 528/363 |
| 5,610,268 A | 3/1997 | Meijer et al. ................ 528/363 |
| 5,902,863 A | 5/1999 | Dvornic et al. ............. 525/431 |
| 6,020,457 A | 2/2000 | Klimash et al. ............. 528/373 |
| 6,043,336 A | 3/2000 | Miller et al. ................. 528/310 |
| 6,248,827 B1 | 6/2001 | Wang et al. ................... 525/91 |
| 6,251,994 B1 | 6/2001 | Wang et al. ................. 525/127 |
| 6,326,424 B1 | 12/2001 | Louis et al. ................. 524/262 |
| 6,338,803 B1 | 1/2002 | Campbell et al. ........... 210/652 |

FOREIGN PATENT DOCUMENTS

| | | | |
|---|---|---|---|
| EP | 0 585 012 A1 | 3/1994 | ............ C08L/9/06 |
| EP | 0 747 429 A1 | 12/1996 | ........... C08L/21/00 |
| EP | 0 924 225 A1 | 6/1999 | ............ C08F/8/32 |
| EP | 1 177 919 A2 | 2/2002 | ............ B60C/1/00 |
| WO | WO 99/48964 | 9/1999 | ............ C08K/5/20 |
| WO | WO 00/49085 | 8/2000 | ........... C08L/21/00 |

OTHER PUBLICATIONS

Newcome, et al., "Dendritic Molecules", Chapter 4, Synthetic Methodologies: Divergent Procedures, pp. 49–106.

"Hybrane™, DMS's New Dendritic Polymers", DSM New Business Development, pp. 1 through 10.

"Synthesis and Characterization of a Series of Monodispers, 1,3,5–Phenylene–Based Hydrocarbon Dendrimers Including $C_{276}H_{186}$ and Their Fluorinated Analogues" by T. M. Miller et al., publised by *American Chemical Society*, 1992, pp. 1018 through 1025.

*Primary Examiner*—Jeffrey Mullis
(74) *Attorney, Agent, or Firm*—John D. DeLong

(57) ABSTRACT

There is disclosed a pneumatic tire having a rubberized component comprising:

(a) 100 parts by weight of at least one rubber containing olefinic unsaturation; and
(b) 1 to 50 phr of a dendrimer.

12 Claims, No Drawings

PNEUMATIC TIRE HAVING A RUBBER COMPONENT CONTAINING A DENDRIMER

RELATED U.S. APPLICATION DATA

This application is a continuation-in-part of Ser. No. 09/912,208 filed Jul. 24, 2001, now abandoned, which claims the benefit of U.S. Provisional Application Ser. No. 60/222,723, filed Aug. 3, 2000.

BACKGROUND OF THE INVENTION

Dendritic macromolecules, also known as dendrimers, are three-dimensional, highly ordered oligomeric and polymeric structure. Dendrimers are tree-like macromolecules consisting of unique branch-upon branch-upon branch structural organizations. The applications envisaged for dendrimers include electronic applications, applications for the calibration of sieves, catalysts (and catalyst supports), selective membranes and coatings, impact modifiers for plastics and crosslinking agents for plastics.

SUMMARY OF THE INVENTION

The present invention relates to a pneumatic tire having a rubber component containing a dendrimer.

DETAILED DESCRIPTION OF THE INVENTION

There is disclosed a pneumatic tire having a rubber component containing a dendrimer rubber composition comprising:

(a) 100 parts by weight of at least one rubber containing olefinic unsaturation; and (b) 1 to 50 phr of a dendrimer.

The dendrimers which can be used in the pneumatic tires of the present invention include generally any of the known dendrimers having a polyvalent core which is covalently bonded to at least two ordered dendritic branches which extend through at least two generations. Dendrimers, also referred to herein as dendritic polymers, comprise a core, plural generations or layers of branches, wherein each generation extends from the core or from a prior generation of branches, and wherein each branch in each generation has the same number of reactive sites (at least 2), from which the branches in the next succeeding generation (if any) extend, or which serve as terminal reactive sites in the last generation of branches. In so called dense star polymers, the reactive sites are symmetrically located at the end of each branch. In unsymmetrically branched dendrimers, the reactive sites are unsymmetrically located on a given branch, e.g., one might be located along the length of the branch while another might be located at the end of the branch. The term dendrimers as used herein is intended to include dendrons and hyperbranched molecules. A dendron is a species of dendrimer having branches emanating from a focal point which is or can be joined to a core, either directly or through a linking moiety. An ammonia core dendrimer might be thought of as an ammonia molecule having 3 dendrons radiating from the core.

Since dendrimers are formed by a series of reiterative or generational reactions, they are typically identified by the number of generations to which they have been reacted, e.g. G5, G10, etc. Under current nomenclature, a dendrimer core with a first set of branches attached thereto is referred to as a "zero generation" or G0 dendrimer. Once the second set of branches is attached to the first set of branches, it is a first generation or G1 Starburst® dendrimer. Dendrimers are identified herein in accordance with this generational nomenclature scheme.

According to U.S. Pat. No. 6,043,336, much of the prior patent literature involving dendrimers use a variation on this nomenclature in which a core with a first set of branches emanating therefrom is referred to as a first generation of G1 dendrimer, instead of a zero generation or G0 dendrimer. Thus the same dendrimer will have a different "G" number, depending upon whether the prior nomenclature literature is followed, or whether the current nomenclature is utilized. The current nomenclature, in which the core and first set of branches are referred to a "G0" dendrimer, is used herein.

Suitable dendrimers for use in the present invention are generically described and specifically disclosed in U.S. Pat. No. 4,558,120. Examples of suitable dendrimers include those having any of the variety of functionally active terminal moieties such as carboxyl, aziridinyl, oxazolinyl, haloalkyl, oxiranyl, hydroxy, isocyanato, amine and carboxylic esters moieties. For example, polyamidoamine dendrimers, polysulfide dendrimers, polyaminosulfide dendrimers, polyether dendrimers, and the like may be utilized in the practice of the present invention, with polyamidoamine dendrimers (PAMAM dendrimers) being most preferred. Dendrimers having generally any number of dendritic branches and any number of generations can be utilized in the practice of the invention, with generations 2 through 12 being preferred.

The dendrimers can be prepared by any known method such as by the excess reactant method. For example, amidoamine dendrimers can be prepared by reacting a nucleophilic core compound such as ammonia with methyl acrylate under conditions sufficient to cause the Michael addition of one molecule of the ammonia to three molecules of the methylacrylate to form an adduct of the formula $N(CH_2CH_2CO_2CH)_3$. Following removal of unreacted methyl acrylate, the above adduct is then reacted with excess ethylenediamine under conditions such that one amine group of the ethylenediamine molecule reacts with the methyl carboxylate group of the core adduct to form a zero generation adduct having three amidoamine moieties. The ratio of excess ethylenediamine to methyl carboxylate moieties is preferably from about 2:1 to about 120:1. Following removal of the unreacted ethylenediamine, the zero generation adduct is then reacted with excess methyl acrylate under Michael's addition conditions to form a second generation adduct having terminal methyl ester moieties, which are subsequently reacted with excess ethylenediamine under amide forming conditions to produce a polyamidoamine dendrimer having ordered, first generation dendritic branches with terminal amine moieties. The excess of co-reactant to reactive moieties is preferably from about 2:1 to about 120:1. Second and higher ordered dendrimers can be formed by alternatively reacting the terminal amine moieties with excess methyl acrylate to form terminal methyl carboxylate groups, removing excess methyl acrylate and reacting the terminal carboxylate groups with excess ethylenediamine. Other amidoamine dendrimers can be made using different organic amines as the core compound. For example, ethylenediamine can be used to produce a tetra-branched dendrimer or diethylenetriamine can be used to produce a penta-branched amidoamine dendrimer. Other dendrimers and methods for producing the same are disclosed in U.S. Pat. No. 4,558,120.

Representative examples of a dendrimer containing disulfide functional groups and sulfhydryl terminated dendrimers are disclosed in U.S. Pat. No. 6,020,457 which is incorporated by reference in its entirety. These dendritic polymers having a single disulfide functional group at the core can be of generally any desired generation and can include any of a variety of different surface functional groups. The single disulfide group at the core can be reduced to form two sulfydryl groups and split the dendritic polymer molecule into two parts, each having a single reactive sulfydryl group to which other molecules, such as fillers, coupling agents or non-dendritic (e.g., linear or branched) polymers, etc., can be bound. The remaining surface groups (which can, for example, be amines, carboxylates, hydroxyl, etc.) may be used for coupling to other fillers, coupling agents or non-dendritic polymers.

Another family of dendrimers are commercially available from DSM under the designation HYBRANE™. According to the product literature, HYBRANE™ dendrimers are made via polycondensation of cyclic anhydrides with diisopropanolamine. Therefore, the primary reaction step leading to the dendrimer is the reaction of the aminodiol with an anhydride. Via a reactive oxazolinium intermediate, the hyperbranched molecule is formed at relatively low temperatures and without a catalyst. HYBRANE™ dendrimers having been prepared with aliphatic and aromatic carboxylic ester end groups, unsaturated fatty acid ester end groups, tertiary amine end groups, acrylate and methacrylate ester end groups, carboxylic acid end groups, trialkoxysilane end groups and polyethylene oxide end groups. Specific examples of HYBRANE™ dendrimers that are commercially available are H1500 (unmodified), HS4700 (50 percent modified with stearic acid) and PS2550 (100 percent modified with stearic acid).

Another family of dendrimers which may be used in the present invention include carbosilane-based dendrimers having a carbosilane core of large size and addition polymer chains emanating from the core. Such dendrimers are described in U.S. Pat. No. 5,276,110 which is incorporated herein in its entirety.

The carbosilane core has a regular dendritic structure free of cross-linking. The dendrimer core is built up in stages or generations from a central silane nucleus by alternating hydrosilylation and vinylation reactions.

The starting nucleus may be unsaturated monosilane such as alkyltrivinyl- or tetravinylsilane, and tetraallylsilane. Alternatively, an unsaturated disilane such as an alkylene-bis-alkyltrivinylsilane can serve as nucleus. The unsaturated group can be any vinylic group subject to hydrosilylation including vinyl, allyl and aryrl groups. The alkylene moiety can be any having 1–6 carbon atoms. Saturated alkyl groups (1–4 C atoms) or aryl groups (phenyl or substituted phenyl) complete the silicon valences. The substituents on the phenyl may be alkyl, alkoxy, phenyl or halide groups.

The hydrosilylation reagent is a halosilane having at least one, preferably at least two, halogen groups attached to silicon. The halogen group may be chloride or bromide. This silane usually is a monosilane, however a disilane may be used.

The core synthesis proceeds by hydrosilylation of the nucleus to introduce active silicon halide sites, and each of these sites is reacted to attach a vinylic group. These vinylic groups then are hydrosilylated to introduce second generation silicon halide sites, and this is continued until at least 48 active silicon halide sites are presented on the periphery of the core. The reactions are controlled to go to substantial completion at each stage so that successive layers of silane branching sites are formed at the periphery. This gives a dense, dendritic non-cross-linked core structure with all reactive sites towards the periphery. Because of the reactions involved, only the desired active sites are reacted and the interior dendritic arms remain unreacted and uncross-linked. The number of generations to achieve at least 48 peripheral silicon halide sites usually is from 3 to 5, depending on the nucleus and reagents chosen.

The outer arms of addition polymer are attached to each of the active silicon halide sites in the periphery of the core. This is accomplished by anionic addition polymerization to preform a living polymer suitably of molecular weight at least about 1000 preferably from about 5000 to about 100,000. These prepolymers have a living end and can be coupled to the reactive silicon halide site in the core. The coupling is controlled to go to completion and to occur only at these halide sites so that a very regular dendritic or star-form structure is achieved.

To form the addition prepolymer for the outer arm, monomers that are susceptible to termination—free anionic polymerization may be used. The living polymer end should be capable of electrophilic substitution at the chlorosilane (or bromosilane) site. Suitable anionic polymerization techniques, reagents and operative monomers are given in: *Encyclopedia of Polymer Science and Engineering*, Second Edition 1985 Vol.2, Page 1 (Chapter on Anionic Polymerization by S. Bywater) J. I. Kroschwitz Ed.-in-Chief, Publisher: Wiley Interscience. Examples of suitable monomers are styrene, α-methylstyrene, paratertiary-butylstyrene, para-dimethyl-t-butylsiloxystyrene, N,N bis(trimethylsilyl) p-aminostyrene, 2-vinylpyridine, 4-vinylpyridine and alkyl-substituted vinylpyridines, butadiene, isoprene, 2,3-dimethylbutadiene, cyclic ethers (e.g. ethylene oxide, propylene oxide) and cyclic sulfides (e.g. ethylene sulfide, propylene sulfide).

These monomers may be used to form living homopolymers or copolymers including random or block copolymers. It is possible to preform the block copolymer and couple it to the core or to couple different polymers in sequence. The living polymers may be formed to have various substituent groups which will not interfere with the coupling reaction at the Si—Cl site. These groups may be at the end of the chain remote from the living end (e.g. by starting each chain with a substituted initiator) or within the chain (by copolymerization e.g. with an amine-, siloxy- or ester-substituted monomer). Examples of initiators having suitable substituent groups are dimethylaminopropyllithium and 5-ethoxy-4-oxo-hexyllithium.

These substitute groups on the living polymer may be selected for the purposes of introducing polar groups to affect solubility or introducing reactive sites for further reaction.

The living addition polymer normally is a straight chain type. However, it is possible to form branches in the living addition polymer by suitable modifiers, e.g. the addition of various amines and ethers affect the microstructure of anionically polymerized dienes. In particular, the addition of dipiperidinoethane produces almost exclusively living 1,2-polybutadiene.

The molecular weight of the carbosilane based dendrimer is usually at least about 50,000 daltons. Depending on the number and size of the addition polymer arms and the size of the core, the molecular weight may range up to about 10,000,000 daltons. At room temperature, the carbosilane based dendrimers are viscous liquids or solids depending on the number of arms, the molecular weight of the arms and the chemical composition of the arms.

Another type of carbosilane dendrimers which may be used were synthesized by Roovers et al, *Polym. Preprints*

1992, 24, 573. This method employs the Pt.-catalyzed addition of methyldichlorosilane to an alkene, followed by nucleophilic substitutions with vinylmagnesium bromide at the terminal dichlorosilane moieties, as the iterative method. Thus, using tetravinylsilane as the initial tetrafunctional core, the first generation tetrakis(methyldichlorosilane) was generated after addition of four equivalents of monomer. Reaction of eight equivalents of vinylmagnesium bromide with pentasilane generated octaolefin. Continued iteration gave rise to the polyalkene, possessing at molecular weight of 6.016 amu at the fourth tier and 64 terminal vinyl groups. These dendritic carbosilanes with 64 and 128 surface Si—Cl bonds had molecular weights between 6,400 and 72,000 amu.

Another type of dendrimers which may be used in the pneumatic tires of the present invention include dendrimers containing lyophilic organosilicon and hydrophilic nanoscopic dendrimers. Such dendrimers are described in U.S. Pat. No. 5,902,863 which is incorporated by references in its entirety. These dendrimer-based networks are prepared from copolydendrimer precursors having well defined hydrophilic polyamidoamine (PAMAM) or polypropyleneimine (PPI) interiors, and organosilicon outer layers ending with ≡SI—OCH$_3$ surface groups. These networks have precisely controllable size, shape and spatial distribution, of nanoscopic hydrophilic and hydrophobic domains. Such constructs are prepared by crosslinking one type of copolydendrimer precursor, or by crosslinking mixtures of different copolydendrimers having different generations of PAMAM or PPI dendrimers in the interior, surrounded by different organosilicon exteriors. Crosslinking can be controlled by adding difunctional, trifunctional or polyfunctional low molecular weight or oligomeric crosslinking agents; or by exposing a copolydendrimer having hydrolyzable surface groups to atmospheric moisture. Elastomeric dendrimer-based networks have low glass temperatures of −15° C. or below, are optically clear, transparent and colorless.

One example of a PAMAM type dendrimer that can be used is one that has been treated with carbohydrate derivatives. Okada et al.[26a] (see Macromolecules 1995, 28, 5391) have reported the persubstitution of PAMAM dendrimers with either lactose or maltose derivatives. This reference is incorporated herein in its entirety. Treatment of PAMAN with an excess of either O-β-D-galactopyranosyl-(1→4)-D-glucono-1.5 lactone, in DMSO at 27 to 40° C. under nitrogen afforded the surface coated cascade, which was ascertained to be a single component by SEC and characterized by IR and CNMR data. By $^1$H NMR and vapor pressure osmometry, the surface of the PAMAM was almost quantitatively coated by the sugar residue. These "sugar balls" were shown to be water soluble but insoluble in ethanol and chloroform.

Additional examples of dendrimers modified with carbohydrate derivatives have been reported by Roy et al. (See R. Roy et al: Tetrahedron Lett 1995, 36, 4377 and D. Zanini et al: Tetrahedron Lett. 1995, 36, 7383.) Roy et al teaches the synthesis of hyperbranched dendritic lactosides and glycosides. These references are incorporated herein in their entirety.

Another type of dendrimers which may be useful in the present invention are polysiloxane dendrimers which may be prepared by an iterative silane hydroxylation and chloride displacement at silicon. The specific preparation of these dendrimers is described by Masame et al, *J. Am. Chem. Soc.* 1990, 12, 7077, which is incorporated hereby in its entirety. Masame et al describes the iterative procedure utilizing two differently branched synthetic equivalents, a trifunctional, hydrido-terminated core and a trigonal monomer. Synthesis of the polysiloxane core and building block were each accomplished by the treatment of trichloromethylsilane with three or two equivalents of the siloxane oligomers, HO[Si(Me)$_2$O]$_5$ Si(Me$_2$)H and HO[Si(Me)$_2$O]$_3$ Si(Me)$_2$H, respectively. Repetitive silicon-based transformations were then employed for dendritic construction. Palladium-catalyzed silane hydroxylation of the core afforded triol, which was then treated with three equivalents of monochloropolysiloxane to generate the hexahydride, first generation dendrimers. Further application of the Pd-mediated hydroxylation, followed by attachment of monochloro-monomer, led to the second and third generation polysiloxane cascades.

Carbon branched dendrimers are also suitable for use in the present invention. The construction of a cascade dendrimer possessing all-saturated, symmetrical tetrahedral branched hydrocarbon interior framework was designed based on the bishomotris nitro precursor. The preparation of Micellanol™ cascades has been described by Newcome et al. See G. R. Newcome et al, Polym. Preprints 1991, 32, 65 and G. R. Newcome et al. *Angew. Chem. Int. Edit.*, 1991, 30, 1176. These references are incorporated by reference in their entirety. In these preparations, the nitrotriol is reacted with benzyl chloride to give a triether, which undergoes denitration-cyanoethylation, (Ono reaction) on treatment with tri-n-butyltin hydride in the presence of acrylonitrile to give the key nitriletriether intermediate. Nitrile plays a critical role in the synthesis, since it can be uniquely converted to both the core previously prepared from tetrakis (2-bromoethyl) methane via citric acid in 17 steps, from tetrakis(β-carbethoxyethyl) methane.

Monodisperse, 1,3,5-phenylene-based hydrocarbon dendrimers, including $C_{276}H_{186}$, may be used in the present invention. The preparation of such dendrimers is taught at Miller, T; Neenan, T. X.; Zayos, R.; and Bair, H. E.; *J. Am. Chem. Soc.* 1992, 114, 1018–1025. This reference is incorporated by reference in its entirety. These materials contain up to 46 benzene rings linked symmetrically. The increasingly large dendrimer arms are prepared stepwise via polladium-catalyzed coupling of arylboronic acids to 3,5-dibramo-1-(trimethyl-silyl) benzene. The aryltrimethylsilane is subsequently converted to a new arylboronic acid by reaction with boron tribromide followed by hydrolysis. Coupling of arylboronic acid dendrimer arms to 1,3,5-tribramobenzene or 1,3,5-tris (3,5-dibranophenyl) benzene is the final stage in the process.

Yet another series of hydrocarbon dendrimers which may be used are described at D. Astruc, M. -H. Desbois, B. Gloaguen, F. Moulines, J. -R. Hamon, in *Organic Synthesis Via Organometallics*, (Eds.: K. H. Dötz, R. W. Hoffman), Vieweg, Braunschweig, 1991, 63; and at Y. -H. Liao, J. R. Moss, *Organometallics* 1995, 14, 2130. These references are incorporated by reference in their entirety. These methods of preparation employ the hexahapto coordination of aromatics by the [(η-C$_5$H$_5$)Fe+] moiety thus activating benzyl positions and allowing hexafunctionalization of permethylbenzene. However, even under forcing conditions, allylation stops at the rigid dodeca-allylated complex to give polyene after demetallation.

The level of dendrimers which may be added to the rubber may range from 1 to 50 parts by weight per 100 parts by weight of rubber (phr). Preferably, the level of dendrimer may range from 3 to 30 phr. Alternatively, the level of dendrimer may range from 1 to 9 phr.

In order to be incorporated into a rubber compound of a tire, the dendrimers are mixed with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect the rubber to be combined with the dendrimer is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

Various dendrimers discussed above have various different functional groups. Of particular interest are those dedrimers which have hydroxyl or amine functionality available. In such instances, it is believed to be desirable to use as the rubber, in whole or in part, a functionalized rubber for direct reaction with the functional group of the dendrimer. One particular type of rubber that would be appropriate is a carboxylated rubber such as the carboxylated forms of SBR, PBD and polyisoprene.

The term "phr" as used herein, and according to conventional practice, refers to "parts by weight of a respective material per 100 parts by weight of rubber, or elastomer."

In addition to the dendrimer and elastomer in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It may be preferred to have the rubber composition for use in the tire component to additionally contain a conventional sulfur containing organosilicon compound. Examples of suitable sulfur containing organosilicon compounds are of the formula:

$$Z\text{-Alk-}S_n\text{-Alk-}Z \qquad (I)$$

in which Z is selected from the group consisting of

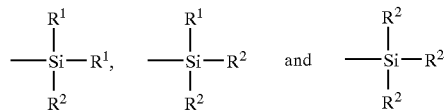

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis (triethoxysilylpropyl)tetrasulfide, 3,3'-bis(triethoxysilylpropyl)octasulfide, 3,3'-bis(trimethoxysilylpropyl) tetrasulfide, 2,2'-bis(triethoxysilylethyl)tetrasulfide, 3,3'-bis (trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis (trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyl-octadecyl)tetrasulfide, 18,18'-bis(tripropoxysilyloctadecenyl)tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis (triethoxysilylpropyl)disulfide and 3,3'-bis (triethoxysilylpropyl)tetrasulfide. Therefore as to formula I, preferably Z is

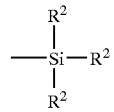

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and dendrimer are mixed in one or more non-productive mix stages. The terms "non-productive" and "productive" mix stages are well known to those having skill in the rubber mixing art. The dendrimer may be added as a separate ingredient or in the form of a masterbatch. The rubber composition containing the dendrimer, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the many dendrimers is their solubility in organic solvents. This feature offers the opportunity to incorporate such dendrimers into the elastomers via a number of ways aside from mechanical working in a mixer or extruder. For example, it is contemplated that one can disperse or dissolve the dendrimers in a polymer cement (elastomer solubilized in an organic solvent) with mixing and removal of the solvent to yield a uniformly dispersed dendrimer in the elastomer. In accordance with another embodiment, one can solubilize the dendrimers in the organic solvent along with the monomer or monomers for subsequent solution polymerization. Under this embodiment, the monomers polymerize to form the elastomer in the presence of dendrimer.

The rubber composition containing the rubber and dendrimer may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

EXAMPLE I

Four rubber compounds labeled Samples 1–4 were prepared to compare the effect of a dendrimer on a rubber composition. Sample 1 (Control) contained an SBR rubber compound with 60 phr carbon black and 10 phr of silica. Sample 2 (present invention) contained an SBR rubber compound with 60 phr carbon black, 10 phr of silica and 5 phr of a dendrimer. Sample 3 (control) contained an SBR rubber compound with 60 phr of carbon black and no silica. Sample 4 (present invention) contain an SBR rubber compound with 60 phr of carbon black, no silica, and 5 phr of a dendrimer. The compositions of each of Samples 1, 2, 3, and 5 are as given in the following Table 1 with amounts in phr. Each of Samples 1, 2, 3, and 4 were evaluated for tear and elongation properties. The physical properties are also given in Tables 1.

TABLE 1

| Sample | Control 1 | 2 | Control 3 | 4 |
|---|---|---|---|---|
| SBR[1] | 100 | 100 | 100 | 100 |
| Dendrimer[2] | 0 | 5 | 0 | 5 |
| Silica | 10 | 10 | 0 | 0 |
| Carbon black[3] | 60 | 60 | 60 | 60 |
| Oil | 15 | 15 | 0 | 0 |
| ZnO | 2 | 2 | 2 | 2 |
| Sulfur | 1.4 | 1.4 | 1.4 | 1.4 |
| CBS | 1.8 | 1.8 | 1.8 | 1.8 |
| DPG | 0.2 | 0.2 | 0.2 | 0.2 |

TABLE 1-continued

| Sample | Control 1 | Control 2 | Control 3 | 4 |
|---|---|---|---|---|
| Strebler Adhesion, Cure 74 min/160° C, Temp 100° C. | | | | |
| Tear Strength (N/mm) | 13.8 | 16.8 | 16.0 | 18.7 |
| Strebler Adhesion, Cure 74 min/160° C., Temp 100° C., Aged 3 Days/90° C. Air | | | | |
| Tear Strength (N/mm) | — | — | 19.0 | 31.5 |
| Ring Modulus, Temp. 23° C., Cure 74 Min/160° C. | | | | |
| Elongation at break (%) | 469.0 | 527.7 | 570.0 | 571.0 |
| Spec Energy (MPa) | 36.5 | 39.7 | 36.5 | 39.7 |
| True Tensile | 106.0 | 113.1 | 128.3 | 127.5 |
| Ring Modulus, Temp. 23° C., Cure 74 Min/160° C., Aged 3 Days/90° C. Air | | | | |
| Elongation at break (%) | 374.2 | 444 | — | — |
| Spec Energy (MPa) | 30.6 | 37.6 | — | — |
| True Tensile | 89.8 | 104.7 | — | — |
| Tensile Die C., Temp. 23° C., Cure 74 Min/160° C. | | | | |
| Elongation at break (%) | 439.8 | 497.0 | — | — |
| Spec Energy (MPa) | 30.8 | 33.3 | — | — |
| True Tensile | 106.6 | 113.0 | — | — |

[1]Solflex 2515 supplied by The Goodyear Tire & Rubber Company
[2]H1500, supplied by DSM N.V.
[3]HAF carbon black Comparison of Sample 1 (control) and Sample 2 (present invention) illustrates the differences in effect between a rubber containing no dendrimer and a rubber containing 5 phr of dendrimer. For example, when one adds 5 phr of dendrimer to the rubber composition as in Sample 2, a significant improvement is seen for tear strength and elongation as compared with properties of the rubber composition containing no dendrimer as in Sample 1. The improvement in tear and elongation is seen for both original and heat aged samples. Similar results are seen in comparing Sample 3 (control) with Sample 4 (present invention). This result is surprising and unexpected, and clearly shows that addition of the dendrimer to the rubber compound at only 5 phr significantly and desirably affects the tear and elongation properties of the compound.

The observed effect of dendrimer on the tear and elongation properties of the rubber compound is surprising and unexpected. It is known in the art to add dendrimer to rubber compositions at relatively high concentrations (greater than 50 phr) to obtain damping. However, the observed damping at the relatively high concentration is measured at low strain and high frequency, and would not generally suggest that improvement in tear and elongation would be expected, especially at lower dendrimer concentrations. By contrast, the observed improvement in tear and elongation in the present are measured at high strain and deformation with slow strain rate. It would not be expected, based on the damping behavior at higher dendrimer concentrations, the observed improved tear and elongation properties in the present invention.

EXAMPLE II

The effect of dendrimer added to rubber compositions was observed for several dendrimers as shown in the following data. Four rubber compounds labeled Samples 5–8 were prepared to compare the effect of a dendrimer on a rubber composition. Sample 5 (Control) contained an SBR rubber compound. Sample 6 (present invention) contained an SBR rubber compound 6 phr of dendrimer H1500. Sample 7 (present invention) contained an SBR rubber compound with 6 phr of dendrimer H2000. Sample 8 (present invention) contained an SBR rubber compound with 6 phr of dendrimer P1000. The compositions of each of Samples 5, 6, 7 and 8 are as given in the following Table 2 with amounts in phr. Each of Samples 5, 6, 7, and 8 were evaluated for tear and elongation properties. The physical properties are also given in Tables 2.

TABLE 2

| Sample | Control 5 | 6 | 7 | 8 |
|---|---|---|---|---|
| SBR, Solflex 2515 | 100 | 100 | 100 | 100 |
| H1500 dendrimer, DSM | 0 | 6 | 0 | 0 |
| H2000 dendrimer, DSM | 0 | 0 | 6 | 0 |
| P1000 dendrimer, DSM | 0 | 0 | 0 | 6 |
| Carbon Black | 60 | 60 | 60 | 60 |
| Silica | 0 | 0 | 0 | 0 |
| Oil | 12 | 6 | 6 | 6 |
| Stearic Acid | 2 | 2 | 2 | 2 |
| ZnO | 2 | 2 | 2 | 2 |
| Sulfur | 1.4 | 1.4 | 1.4 | 1.4 |
| CBS | 1.8 | 1.8 | 1.8 | 1.8 |
| DPG | 0.2 | 0.2 | 0.2 | 0.2 |
| Strebler Adhesion, Cure 74 Min/160° C., Temp 100° C. | | | | |
| Tear Strength (N/MM) | 16.6 | 22.3 | 23.4 | 24.5 |
| Strebler Adhesion, Cure 74 Min/160° C., Temp 100° C., Aged 3 Days/90° C. Air | | | | |
| Tear Strength (N/MM) | 13 | 19.3 | 19.6 | 17.9 |
| Ring Modulus, Temp. 23° C. Cure 74 Min/160° C., Aged 3 Days/90° C. Air | | | | |
| Elongation at break (%) | 445.4 | 477 | 482.1 | 470.6 |
| Spec Energy (MPa) | 35.7 | 39.1 | 40.1 | 38.7 |
| True Tensile | 105.3 | 108.9 | 111.7 | 107.3 |
| Ring Modulus, Temp. 23° C., Cure 74 Min/160° C. | | | | |
| Elongation at break (%) | 538.1 | 528.4 | 566.6 | 556.2 |
| Spec Energy (MPa) | 42.5 | 40.7 | 47.6 | 44.6 |
| True Tensile | 128.2 | 119 | 135.8 | 128.1 |

As is apparent from Table 2, the effect of dendrimer on the tear and elongation properties of the rubber compound was observed for several different dendrimers. As compared with Sample 5 (control), the original and aged tear and elongation was observed to improve significantly for the three dendrimers presented in Table 2 as Sample 6, 7, and 8. As discussed previously herein, this behavior is surprising and unexpected.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component made from a rubber composition comprising
    (a) 100 parts by weight of at least one rubber containing olefinic unsaturation; and
    (b) from 1 to 6 phr of a dendrimer made via the polycondensation of cyclic anhydrides with diisopropanolamine.

2. The pneumatic tire of claim 1, wherein the rubber composition comprises from 1 to 5 phr of a dendrimer made via the polycondensation of cyclic anhydrides with diisopropanolamine.

3. The pneumatic tire of claim 1, wherein the rubber composition comprises from 5 to 6 phr of a dendrimer made via the polycondensation of cyclic anhydrides with anolamine.

4. The pneumatic tire of claim 1 wherein said dendrimers have a functionally active terminal moiety selected from the group consisting of carboxyl, vinyl, aryl, aziridenyl, oxazolinyl, haloalkyl, oxiranyl, hydroxy, isocyanato, amine, carboxylic ester moieties, trialkoxysilane, acrylate, methacrylate and polyethylene oxide.

5. The pneumatic tire of claim 1 wherein the number of generations range from 2 to 12.

6. The pneumatic tire of claim 1 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, carboxylated rubber, EPDM, silicon-coupled star-branched polymers, tin-coupled star-branched polymers and mixtures thereof.

7. The pneumatic tire of claim 1 wherein from 0.5 to 20 phr of a sulfur containing organosilicon compound is present and is of the formula:

$$Z\text{-Alk-}S_n\text{-Alk-}Z \qquad \text{I}$$

in which Z is selected from the group consisting of

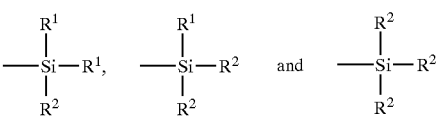

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

8. The pneumatic tire of claim 1 wherein said composition is thermomechanically mixed at a rubber temperature in a range of from 140° C. to 190° C. for a total mixing time of from 1 to 20 minutes.

9. The pneumatic tire of claim 1 wherein said tire is selected from the group consisting of race tires, passenger tires, aircraft tires, agricultural, earthmover, off-the-road and truck tires.

10. The pneumatic tire of claim 1 where said tire is a radial.

11. The pneumatic tire of claim 1 wherein said rubber component is selected from the group consisting of tread, sidewall, apex, chafer, sidewall insert, wirecoat and innerliner.

12. The pneumatic tire of claim 11 wherein said component is a tread.

* * * * *